(12) United States Patent
Somanath et al.

(10) Patent No.: US 11,133,033 B2
(45) Date of Patent: Sep. 28, 2021

(54) CINEMATIC SPACE-TIME VIEW SYNTHESIS FOR ENHANCED VIEWING EXPERIENCES IN COMPUTING ENVIRONMENTS

(71) Applicant: Intel Corporation, Santa Clara, CA (US)

(72) Inventors: Gowri Somanath, Santa Clara, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/922,202

(22) Filed: Jul. 7, 2020

(65) Prior Publication Data
US 2021/0056998 A1    Feb. 25, 2021

Related U.S. Application Data

(63) Continuation of application No. 15/685,213, filed on Aug. 24, 2017, now Pat. No. 10,706,890.

(51) Int. Cl.
*H04N 5/77* (2006.01)
*G11B 27/00* (2006.01)
*H04N 5/93* (2006.01)
*H04N 5/92* (2006.01)
*G11B 27/036* (2006.01)
(Continued)

(52) U.S. Cl.
CPC .......... *G11B 27/036* (2013.01); *G06T 3/0093* (2013.01); *G06T 3/4007* (2013.01); *G06T 3/4046* (2013.01); *G06T 7/246* (2017.01); *G06T 2207/10016* (2013.01); *G06T 2207/20081* (2013.01); *G06T 2207/20084* (2013.01); *G06T 2207/20221* (2013.01)

(58) Field of Classification Search
USPC ..... 386/223, 278, 280, 326, 225; 348/42, 48
See application file for complete search history.

(56) References Cited

U.S. PATENT DOCUMENTS 9,978,425 B2    5/2018  Kirk et al.
10,706,890 B2   7/2020  Somanath et al.
(Continued)

OTHER PUBLICATIONS

United States Patent and Trademark Office, "Non Final Office Action," issued in connection with U.S. Appl. No. 15/685,213 dated Mar. 15, 2019, 21 pages.

(Continued)

*Primary Examiner* — Daquan Zhao
(74) *Attorney, Agent, or Firm* — Hanley, Flight & Zimmerman, LLC

(57) ABSTRACT

A mechanism is described for facilitating cinematic space-time view synthesis in computing environments according to one embodiment. A method of embodiments, as described herein, includes capturing, by one or more cameras, multiple images at multiple positions or multiple points in times, where the multiple images represent multiple views of an object or a scene, where the one or more cameras are coupled to one or more processors of a computing device. The method further includes synthesizing, by a neural network, the multiple images into a single image including a middle image of the multiple images and representing an intermediary view of the multiple views.

27 Claims, 12 Drawing Sheets

(51) Int. Cl.
    *G06T 3/40*       (2006.01)
    *G06T 7/246*     (2017.01)
    *G06T 3/00*       (2006.01)
    *H04N 13/00*    (2018.01)

(56) References Cited

U.S. PATENT DOCUMENTS

| | | |
|---|---|---|
| 2011/0242271 A1 | 10/2011 | Ogale et al. |
| 2015/0131924 A1 | 5/2015 | He et al. |
| 2020/0012940 A1* | 1/2020 | Liu .................... H04N 7/0135 |

OTHER PUBLICATIONS

United States Patent and Trademark Office, "Final Office Action," issued in connection with U.S. Appl. No. 15/685,213 dated Sep. 23, 2019, 15 pages.

United States Patent and Trademark Office, "Notice of Allowance and Fee(s) Due," issued in connection with U.S. Appl. No. 15/685,213 dated Mar. 3, 2020, 14 pages.

Zhou et al., "View Synthesis by Appearance Flow," MICCAI 2015, Sep. 17, 2016, 16 pages.

Liu et al., "Video Frame Synthesis using Deep Voxel Flow," Cornell University Library Feb. 8, 2017, 9 pages.

Niklaus et al., "Video Frame Interpolation via Adaptive Convolution," IEEE Computer Society Conference on Computer Vision and Pattern Recognition, Proceedings, IEEE Computer Society, US, Jul. 21, 2017, 10 pages.

International Searching Authority, "International Search Report and Written Opinion," issued in connection with PCT Application No. PCT/US2018/047775, dated Nov. 6, 2018, 11 pages.

* cited by examiner

CINEMATIC SPACE-TIME VIEW SYNTHESIS FOR ENHANCED VIEWING EXPERIENCES IN COMPUTING ENVIRONMENTS

CROSS-REFERENCE TO RELATED APPLICATIONS

This patent arises from a continuation U.S. patent application Ser. No. 15/685,213 (Now U.S. Pat. No. 10,706,890), filed on Aug. 24, 2017, entitled "CINEMATIC SPACE-TIME VIEW SYNTHESIS FOR ENHANCED VIEWING EXPERIENCES IN COMPUTING ENVIRONMENTS. The contents of the aforementioned application(s) and/or patent(s) are hereby incorporated herein by reference in their entireties for all purposes.

FIELD

Embodiments described herein relate generally to data processing and more particularly to facilitate cinematic space-time view synthesis for enhanced viewing experiences in computing environments.

BACKGROUND

Using multi-camera systems for achieving cinematic effects for photos and videos is well known. Although conventional systems can show object segmentation and depth based effects, such systems and techniques are limited to merely a single frame or a time snapshot.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
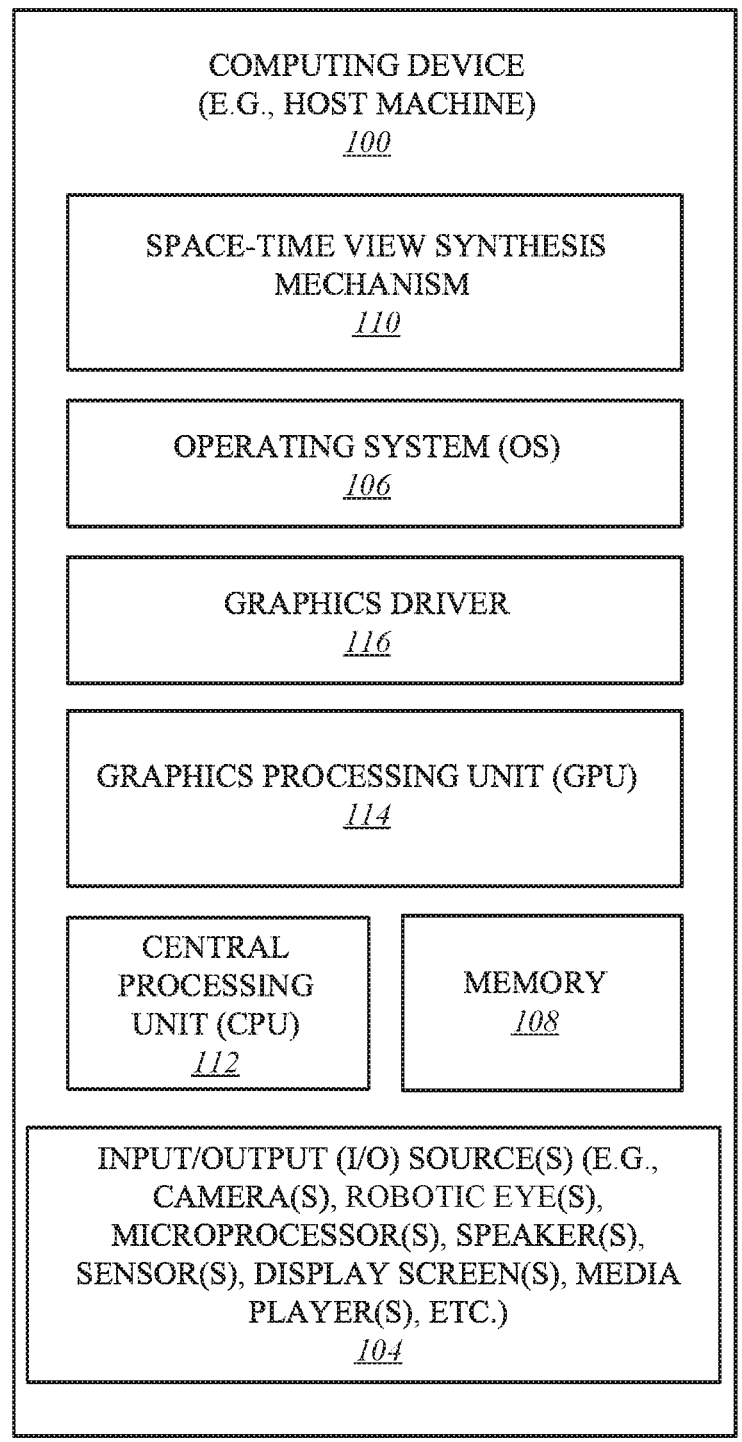
FIG. 1 illustrates a computing device employing a space-time view synthesis mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for computing and showing generalized space-time view synthesis that allow for creation of cinematic time-space camera paths by generating intermediate views. For example, two or more frames in a series of frames forming a video stream, obtained over time and/or space, may be processed in space-time view synthesis to obtain an intermediate view between each set of two images, which are then offered to users for smoother viewing experience. It is contemplated that "frames" may be regarded as time-based, while "images" may be regarded as spaced-based; however, for the sake of brevity, on several occasions throughout this document, frames and images are referenced interchangeably.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a space-time view synthesis mechanism ("view synthesis mechanism") 110 according to one embodiment. Computing device 100 represents a communication and data processing device including (but not limited to) smart wearable devices, smartphones, virtual reality (VR) devices, head-mounted display (HMDs), mobile computers, Internet of Things (IoT) devices, laptop computers, desktop computers, server computers, etc.

Computing device 100 may further include (without limitations) an autonomous machine or an artificially intelligent agent, such as a mechanical agent or machine, an electronics agent or machine, a virtual agent or machine, an electromechanical agent or machine, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Throughout this document, "computing device" may be interchangeably referred to as "autonomous machine" or "artificially intelligent agent" or simply "robot".

It is contemplated that although "autonomous vehicle" and "autonomous driving" may be referenced throughout this document, embodiments are not limited as such. For example, "autonomous vehicle" is not limited to an automobile but that it may include any number and type of autonomous machines, such as robots, autonomous equipment, household autonomous devices, and/or the like, and any one or more tasks or operations relating to such autonomous machines may be interchangeably referenced with autonomous driving.

Computing device 100 may further include (without limitations) large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 100 may include a mobile computing device employing a computer platform hosting an integrated circuit ("IC"), such as system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computer device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or combinations of software and hardware.

In one embodiment, as illustrated, view synthesis mechanism 110 may be hosted by operating system 106 of computing device 100. In another embodiment, view synthesis mechanism 110 may be hosted or facilitated by graphics driver 116. In yet another embodiment, view synthesis mechanism 110 may be hosted by or part of graphics processing unit ("GPU" or simply graphics processor") 114 or firmware of graphics processor 114. For example, view synthesis mechanism 110 may be embedded in or implemented as part of the processing hardware of graphics processor 114. Similarly, in yet another embodiment, view synthesis mechanism 110 may be hosted by or part of central processing unit ("CPU" or simply "application processor") 112. For example, view synthesis mechanism 110 may be embedded in or implemented as part of the processing hardware of application processor 112.

In yet another embodiment, view synthesis mechanism 110 may be hosted by or part of any number and type of components of computing device 100, such as a portion of view synthesis mechanism 110 may be hosted by or part of operating system 116, another portion may be hosted by or part of graphics processor 114, another portion may be hosted by or part of application processor 112, while one or more portions of view synthesis mechanism 110 may be hosted by or part of operating system 116 and/or any number and type of devices of computing device 1500. It is contemplated that embodiments are not limited to any particular implementation or hosting of view synthesis mechanism 110 and that one or more portions or components of view synthesis mechanism 110 may be employed or implemented as hardware, software, or any combination thereof, such as firmware.

Computing device 100 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface (s) may include, for example, a wireless network interface having antenna, which may represent one or more antenna (e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
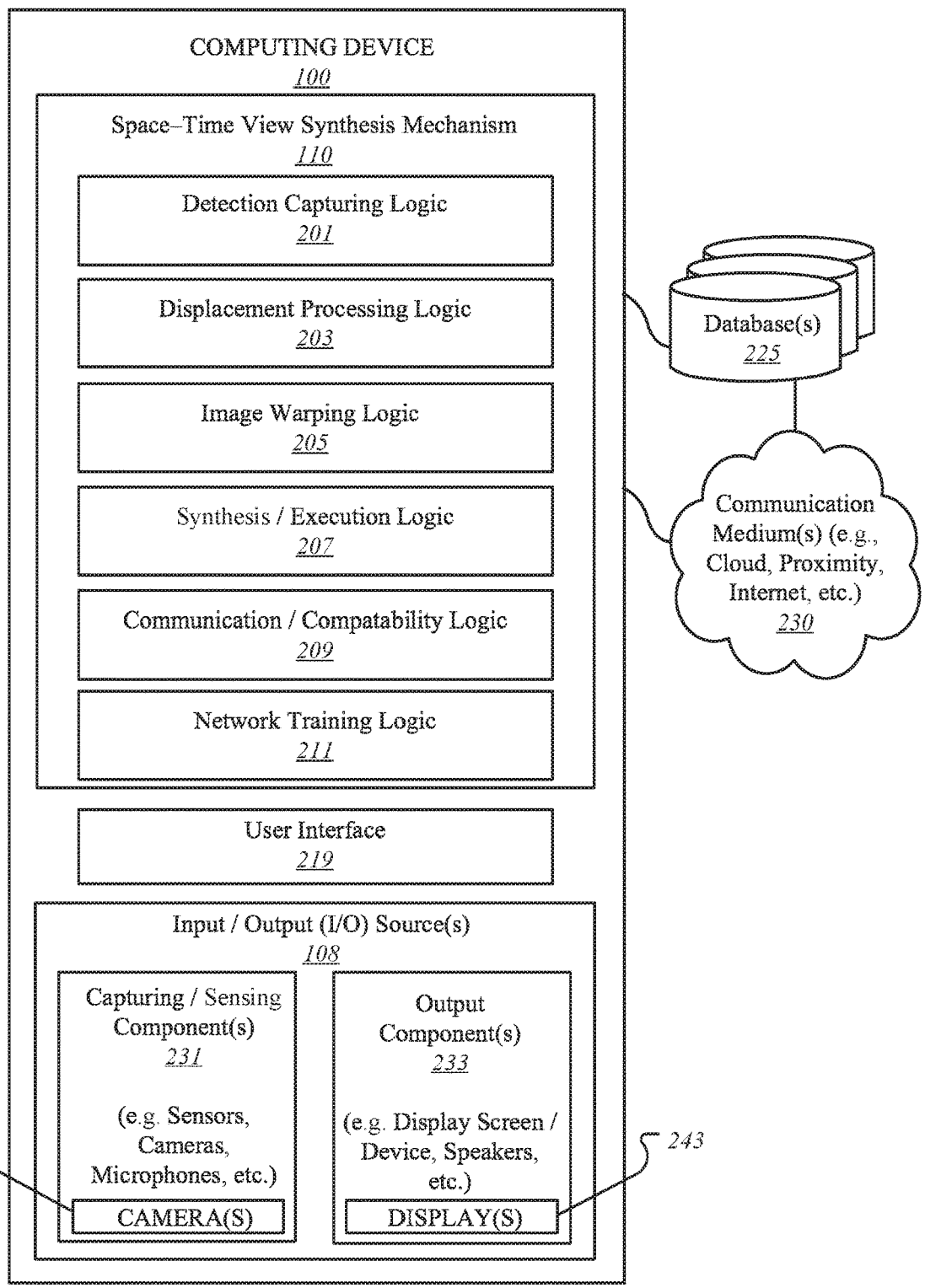
FIG. 2 illustrates a space-time view synthesis mechanism according to one embodiment.

FIG. 2 illustrates space-time view synthesis mechanism 110 of FIG. 1 according to one embodiment. For brevity, many of the details already discussed with reference to FIG. 1 are not repeated or discussed hereafter. In one embodiment, view synthesis mechanism 110 may include any number and type of components, such as (without limitations): detection/capturing logic 201; displacement processing logic 203; image warping logic 205; synthesis/execution logic 207; communication/compatibility logic 209; and network training logic 211.

Computing device 100 is further shown to include user interface 219 (e.g., graphical user interface (GUI)-based user interface, Web browser, cloud-based platform user interface, software application-based user interface, other user or application programming interfaces (APIs) etc.). Computing device 100 may further include I/O source(s) 108 having capturing/sensing component(s) 231, such as camera(s) (e.g., Intel® RealSense™ camera), and output component(s) 233, such as display(s) (e.g., integral displays, tensor displays, etc.).

Computing device 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including capturing/sensing component(s) 231 and output component(s) 233. In one embodiment, capturing/sensing component(s) 231 may include sensor array (such as microphones or microphone array (e.g., ultrasound microphones), cameras or camera array (e.g., two-dimensional (2D) cameras, three-dimensional (3D) cameras, infrared (IR) cameras, depth-sensing cameras, etc.), capacitors, radio components, radar components, etc.), scanners, accelerometers, etc. Similarly, output component(s) 233 may include any number and type of display devices or screens, projectors, speakers, light-emitting diodes (LEDs), one or more speakers and/or vibration motors, etc.

For example, as illustrated, camera(s) 241 may include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, display(s) 243 may include any number and type of displays, such as integral displays, tensor displays, stereoscopic displays, etc., including (but not limited to) embedded or connected display screens, display devices, projectors, etc.

Figure 3A:
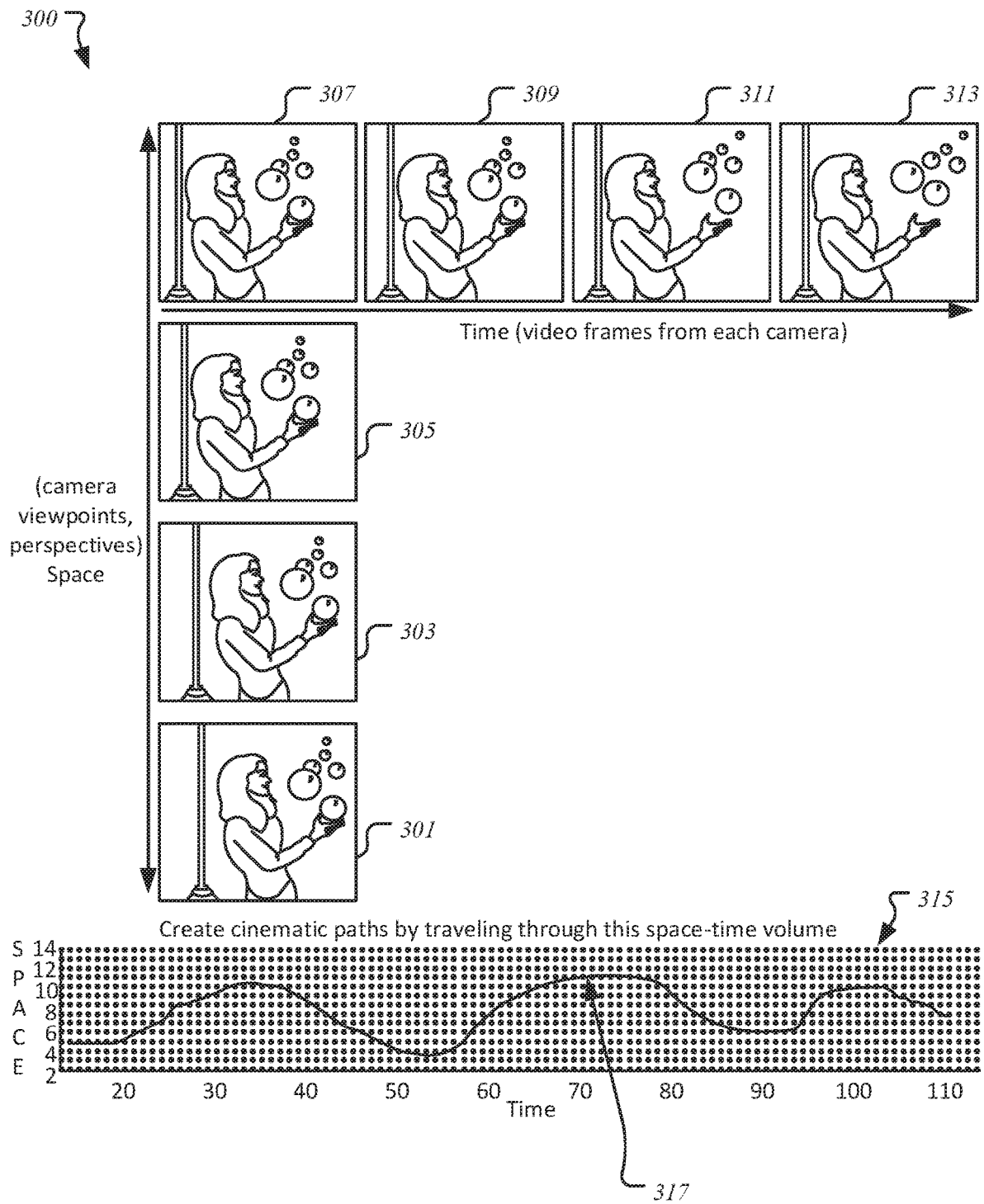
FIG. 3A illustrates an overview of cinematic space-time view synthesis and a corresponding graph according to one embodiment.

A collection of cameras, such as camera(s) 241, embedded or coupled to a single device, such as a computing device 100, or multiple devices may be used to capture a video stream (or a series of images) of a scene from different perspectives or positions, where each perspective may correspond to a camera and the different perspectives indicate the dimension of "space", while the temporal frames indicate the dimension of "time". This is illustrated in FIG. 3A, top panel, where the horizontal dimension is associated with "time" and there is an example of video frames acquired (such as video frames 307, 309, 311, 313) that correspond to one single camera of camera(s) 241 acquiring images at different points in times (where this change in perspective can be appreciated by observing the illustrated circular objects changing positions as they move away from the hand of the person). The vertical dimension in FIG. 3A, left panel, is associated with "space" or different perspectives captured by multiple of camera(s) 241 positioned in different locations producing corresponding images 307, 305, 303 and 301 (where this change in perspectives can be appreciated by the increased relative displacement between the person and the pole in moving from images 307 to 305 to 303 to 301).

This space-time volume may be sampled in a discrete and uniform manner, as illustrated by the graph 315 in FIG. 3A, where each dot corresponds to an image captured at a particular perspective and time, and where a cinematic space-time path may refer as one that smoothly traverses this space along any user-defined path. Since the sampling of this space may be discrete due to limited frame rate and number of cameras, such as camera(s) 241, a smooth path may involve interpolating between frames along any dimension or cut of this space, such as interpolating between two temporal frames from the same or different cameras (to increase or change the fame rate), or interpolate between different camera views at the same time, etc.

Current techniques are limited at creating a virtual camera track around an object of interest at one instance of time, such as a virtual camera moves while the object is frozen in time. This is spatial view synthesis that is projected merely as a vertical line on a space-time volume graph at a specific time on the horizontal axis. Further, current techniques require knowledge of camera positions (e.g., calibration information) to be able to perform three-dimensional (3D) reconstruction of a scene. Thus, to achieve free camera movement for a video sequence, conventional techniques would have to produce sets of 3D reconstructions, one for each time instance and then transition the camera across these models.

In one embodiment, view synthesis mechanism 110 provides for a novel technique that does not require calibration information, precise frame synchronization, etc., and is highly intelligent to be used for both spatial and temporal frame interpolation with no necessary knowledge of camera positions.

Further, in one embodiment, view synthesis mechanism 110 may be used to take time-spaced frames from relevant cameras, such as camera(s) 241 and/or other cameras, and interpolate to produce images directly. For example, network training logic 211 may be used to train neural networks/models from different desired paths between two frames corresponding to and captured by one or more cameras 241 as facilitated by detection/capturing logic 201. It is contemplated that the computational advantage and direct image generation of this holistic approach, as facilitated by view synthesis mechanism 110, significantly outweighs the hard to solve problems with errors and temporal inconsistencies in 3D reconstruction-based approach of conventional techniques.

In one embodiment, network training logic 211 may be used to train out neural networks to interpolate along the hull of a path joining the multiple cameras, such as camera(s) 241, embedded into or connected with a single or multiple computing devices, such as computing device 100. This novel technique allows for (without limitations): 1) increasing frame rate of videos (e.g., creating slow-motion videos, up-sample frames per second (FPS) for different target displays, etc.); 2) creating novel experiences extending replay technology effects that are currently limited to generating interpolated views a single moment in time; 3) applying to new and upcoming camera setups, such as drones capturing sports scenes, public and/or personal social events, such as concerts, weddings, etc.; 4) creating content and experiences for virtual reality (VR)/mixed reality (MR) headsets, such as personalized replays where a user may experience the same video with multiple cameras and time movements, as desired or necessitated without restrictions.

In one embodiment, a pair of images/frames may be captured by camera(s) 241 as facilitated by detection/capturing logic 201, where this pair of images/frames (e.g., RGB images/frames) is used as an input into a neural network using deep learning approach to obtain an intermediate view to serve as a middle image/frame of the pair of images/frames an output. For example, network training logic 211 may be used for training a neural network, such as a convolutional neural network (CNN), to perform the recommended processes to go from receiving the input to offering the output. In one embodiment, this training of the main CNN may be done end-to-end as a single, monolithic CNN. It is contemplated that although CNN is used as an example of neural network being trained and used, embodiments are not limited as such and may be applied to any number and type of other neural networks. Further, terms like "image" and "frame" may be used interchangeably throughout this document.

For example, as illustrated and described with reference to FIG. 4B, displacement processing logic 203 may be used to take the input of the two RGB images or frames and generate a displacement map that may find where exactly each pixel in the first image moves into the second image (e.g., optical flow of pixels). Similarly, in one embodiment, image warping logic 205 may then be used as a custom layer 421 of FIG. 4B that takes as input the two images as well as the displacement map (or any other previously generated displacement maps) and warps the two images about half-way to obtain two versions of the middle image, such as warped images 425A and 425B of FIG. 4B.

This process at the trained/training neural network (such as a trained/training CNN) continues with synthesis/execution logic 207 to produce a final component that takes both warped images and combines them into a cleaner, smoother, and potentially artifact-free synthesized "middle" image.

For example, the input images may contain both camera and object motions, where an output image may be such that the virtual-generated camera viewpoint may be geometrically in the middle of the two input camera views presented by the two images, where the object motions are interpolated to be half-way between the two inputs.

In one embodiment, a pair of connected CNNs may be used, such as a first CNN that generates a flow or displacement map between the input images and the target middle image, while a second CNN that employs a custom layer to warp the pixels of the two input images based on flow/displacement map to generate and output the final "middle" image representing the final output view.

This novel technique does not require an explicit camera positions or calibration information, which can be cumbersome to obtain or maintain over time, such as difficulty in having stable cameras with a degree of precision temporally if they were embedded in or installed on a drone. Further, this novel technique does not depend on or require depth estimation or 3D reconstruction are which can have challenges depending on scene texture, objects, and other factors. For example, the quality of view generated using a depth map based on 3D rendering techniques are typically limited by the quality of the input depth maps which can be noisy and incomplete. Moreover, this novel technique does not require any high precision temporal synchronization between cameras, which is typically needed in conventional techniques for algorithms estimating 3D geometry calibration between cameras and reconstruction.

In one embodiment, network training logic 211 may be used to train the same neural network to be applied or used with both spatial and temporal interpolation and any combination thereof. In one embodiment, any neural network-related work, as facilitated by network training logic 211, may be applied to space-time interpolation that is capable of using merely a pair of images/frames representing a pair of views to generate a target middle image/frame representing a middle view without requiring any explicit knowledge of camera calibration or position, plane-sweep volumes or camera pose information, etc.

As discussed above, in one embodiment, detection/capturing logic 201 is used to obtain, for example, two input images without any knowledge of or information about the cameras, such as camera(s) 241, calibration data, or any other such information. The two images are then used in an input into and processed through a neural network (e.g., CNN) that is trained by network training logic 211. In one embodiment, the neural network-based processes may include estimating a displacement/flow map as facilitated by displacement processing logic 203, warping of the images as facilitated by warping logic 205, and using a custom layer for synthesizing, generating, and outputting of a middle image representing an intermediate of the two views represented by the pair of images as facilitated by synthesis/execution logic 207.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc.), and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "space-time", "view synthesizing", "displacement or flow mapping" "warping", "image", "frame", "view", "neural network", "CNN", "intermediary", "middle", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from view synthesis mechanism 110 to facilitate various embodiments including adding, removing, and/or enhancing certain features. For brevity, clarity, and ease of understanding of view synthesis mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 3A illustrates an overview 300 of cinematic space-time view synthesis and a corresponding graph 315 according to one embodiment. For brevity, many of the details previously discussed with reference to FIGS. 1-2 may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

As illustrated, a series of images and/or frames 301, 303, 305, 307, 309, 311, 313 may be captured or obtained by one or more cameras of a computing device over multiple viewpoints, perspectives, and time to provide a serious of space-time views as presented by images/frames 301-313. For example, images 301, 303, 305, 307 may be taken by multiple cameras at the same time, such as each camera capturing an image of the same object or scene from a select perspective that provides a unique view of the object/scene corresponding to that camera. As illustrated, for example, four cameras may be used to simultaneously capture images of the same object/scene such that the four images 301, 303, 305, 307 correspond to the four cameras.

Similarly, the cameras may be used to take images of the object/scene over time or in chronological order so that a series of images are obtained over various points in time. For example, a camera associated with frame 307 may capture multiple frames 307, 309, 311, 313 representing video frames for the camera over various points in time.

The illustrated graph 315 shows cinematic path 317 that travels through the space-time volume of images and/or frames 301, 303, 305, 307, 309, 311, 313 and other images. Further, for example, the dots on graph 315 and indicative of images/frames, such as 301, 303, 305, 307, 309, 311, 313, while the plane background is area in time and space devoid of any images. As discussed with reference to FIG. 2, view synthesis mechanism 110 provides for a novel technique, using deep learning of neural networks, to offer intermediary images to fill in the plane background for a smoother representation of video or image streams to the user using one or more display devices.

Figure 3B:
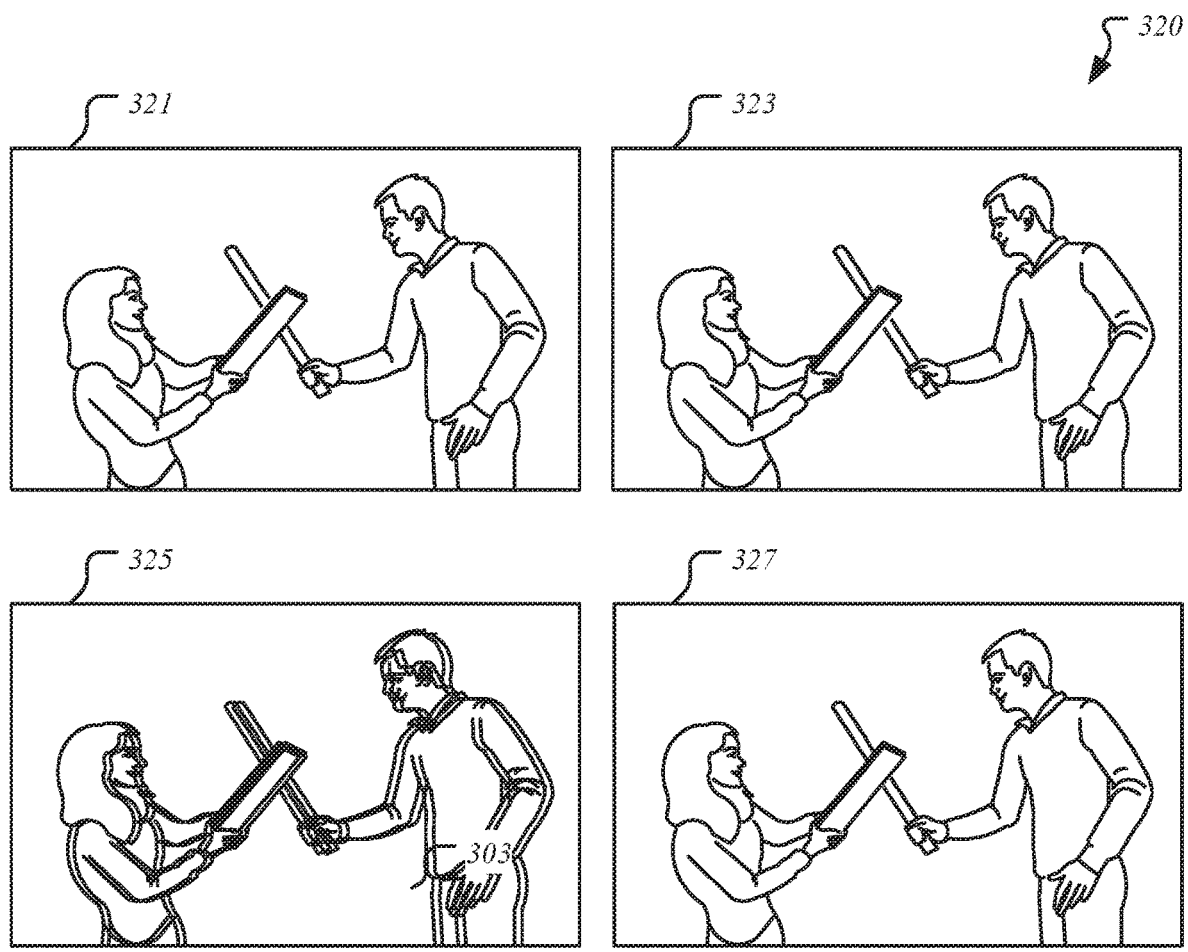
FIG. 3B illustrates a spatial view interpolation according to one embodiment.

FIG. 3B illustrates a spatial view interpolation 320 according to one embodiment. For brevity, many of the details previously discussed with reference to FIGS. 1-3A may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

The illustrate embodiment shows spatial view interpolation 320 where two cameras ae translated along horizontal axis. For example, image 1 321 is captured by camera 1 and regarded as input image 1, while image 2 323 is captured by camera 2 and regarded as input image 2 such that images 1 321, 2 323 may be captured simultaneously by cameras 1 and 2 offering two views, respectively, of the same scene at the same point in time.

In one embodiment, using view synthesis mechanism 110 of FIG. 1, images 1 321, 2 323 are processed through view synthesis at a neural network to obtain a space-based intermediary view of images 1 321, 2 323. For example, image 325 represents overlapping of images 1 321 and 2 323 visualizing parallax between cameras 1 and 2, while image 327 is a final "middle" image generated through view synthesis and represents the intermediary view of images 1 321, 2 323. For example, image 1 321 is obtained in space s and image 2 323 is obtained in space s+1, both at time t, then the displacement/flow map, F, of middle/intermediary image 327 is represented by: [s+(s+1)]/2 at t.

Figure 3C:
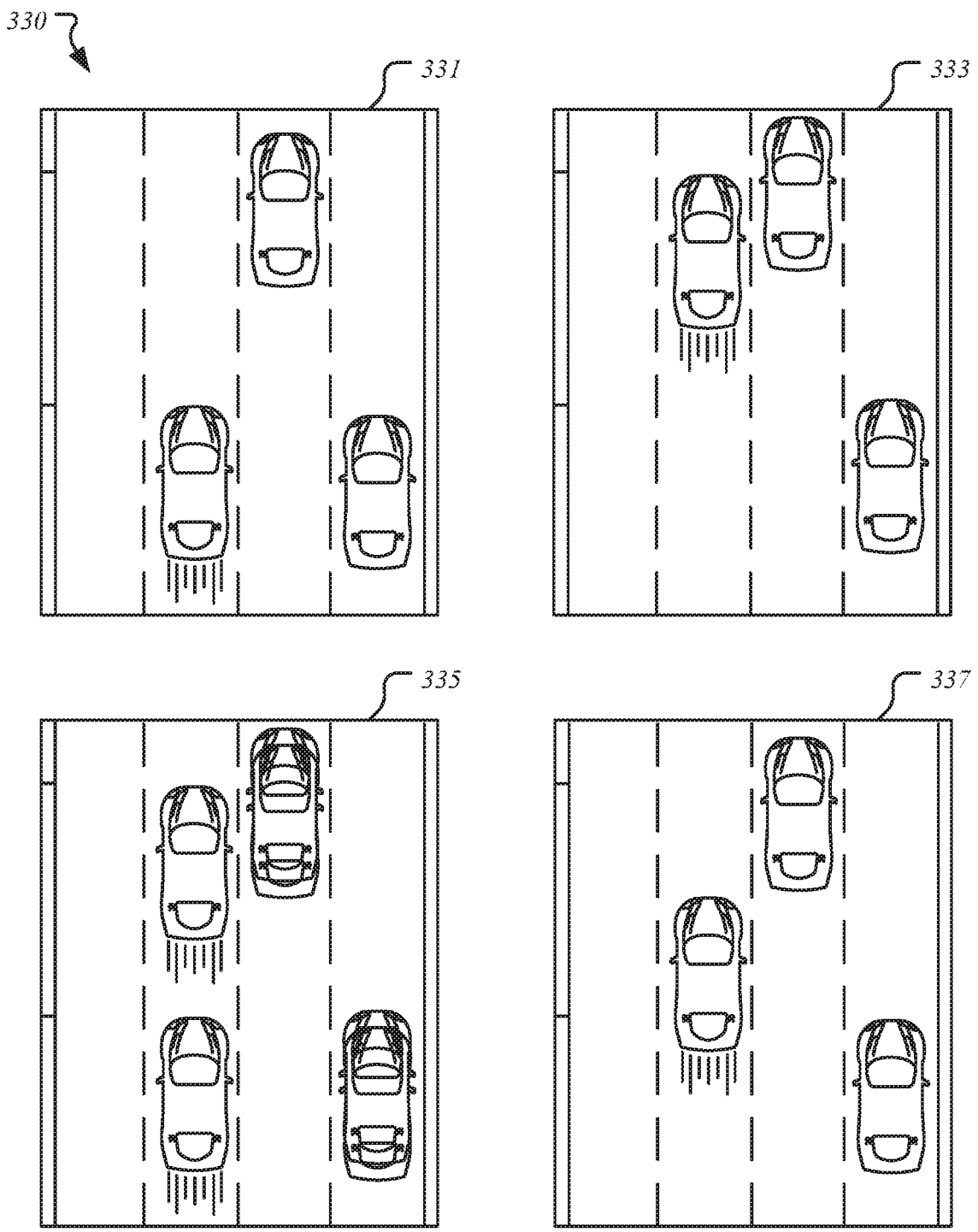
FIG. 3C illustrates a temporal interpolation according to one embodiment.

FIG. 3C illustrates a temporal interpolation 330 according to one embodiment. For brevity, many of the details previously discussed with reference to FIGS. 1-3B may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

As described with reference to FIG. 3B, in this illustration, frame 1 331 and frame 2 333 as captured by cameras 1 and 2, respectively, at the point in time providing two different views of the same object or scene, where cameras 1 and 2 may be associated with one or more computing devices. As described above, frame 335 represents an overlap of frames 1 331 and 2 333 visualizing parallax between cameras 1 and 2, while using view synthesis at a trained neural network (e.g., CNN), as facilitated by view synthesis mechanism 110 of FIG. 1, a middle image, such as frame 337, representing a space-based intermediary view of frames 1 331 and 2 333 is generated and offered to the user, over one or more communication mediums (e.g., cloud network, Internet, proximity network, etc.), using one or more display devices. For example, frame 1 331 is obtained in space s and frame 2 333 is obtained in space s+1, both at time t, then the displacement/flow map, F, of middle/intermediary image 337 is represented by: [s+(s+1)]/2 at t.

Figure 3D:
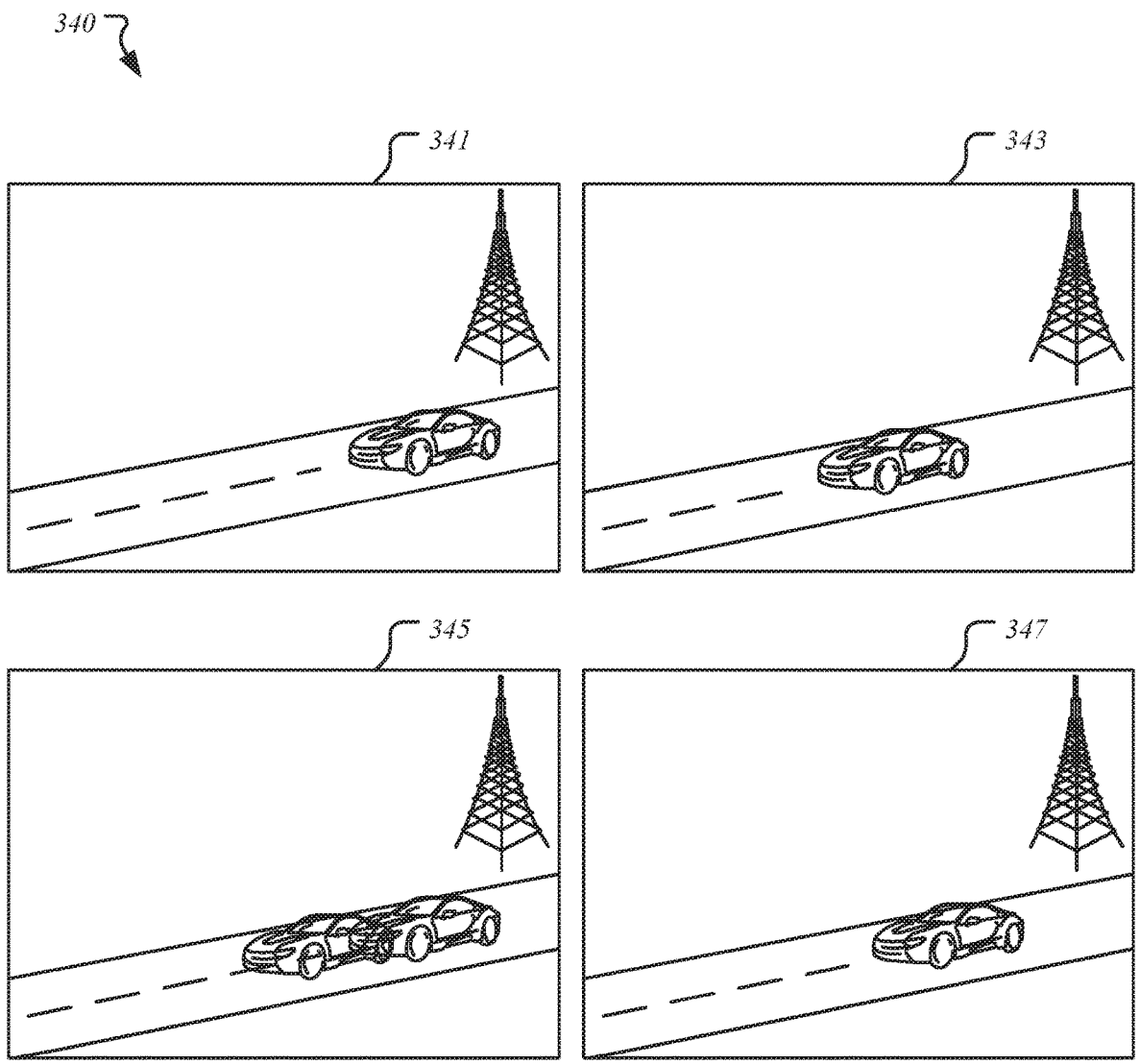
FIG. 3D illustrates a spatial view interpolation according to one embodiment.

FIG. 3D illustrates a time view interpolation 340 according to one embodiment. For brevity, many of the details previously discussed with reference to FIGS. 1-3C may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

In this illustrated embodiment, frame 1 341 is captured by camera 1 at time T, while frame 2 343 is captured by the same camera 1 at time T+1. Stated differently, while two cameras were used in FIGS. 3B-3C for capturing two views of the same object/scene at the same point in time, here, in time view interpolation 340, a single camera associated with a computing device is used to capture two views of the object/scene from the same space or physical location, but at two points in time.

In this embodiment, image 345 represents overlapping of frames 1 341 and 2 343 visualizing parallax, while view synthesis mechanism 110 of FIG. 1 is triggered to perform view synthesis using a trained neural network (e.g., CNN) to provide a middle frame, such as frame 347, representing a time-based intermediary view of frames 1 341 and 2 343. For example, frame 1 341 is obtained at time t and frame 2 343 is obtained in time t+1, both in space s, then the displacement/flow map, F, of middle/intermediary frame 347 is represented by: [t+(t+1)]/2 at s.

Figure 3E:
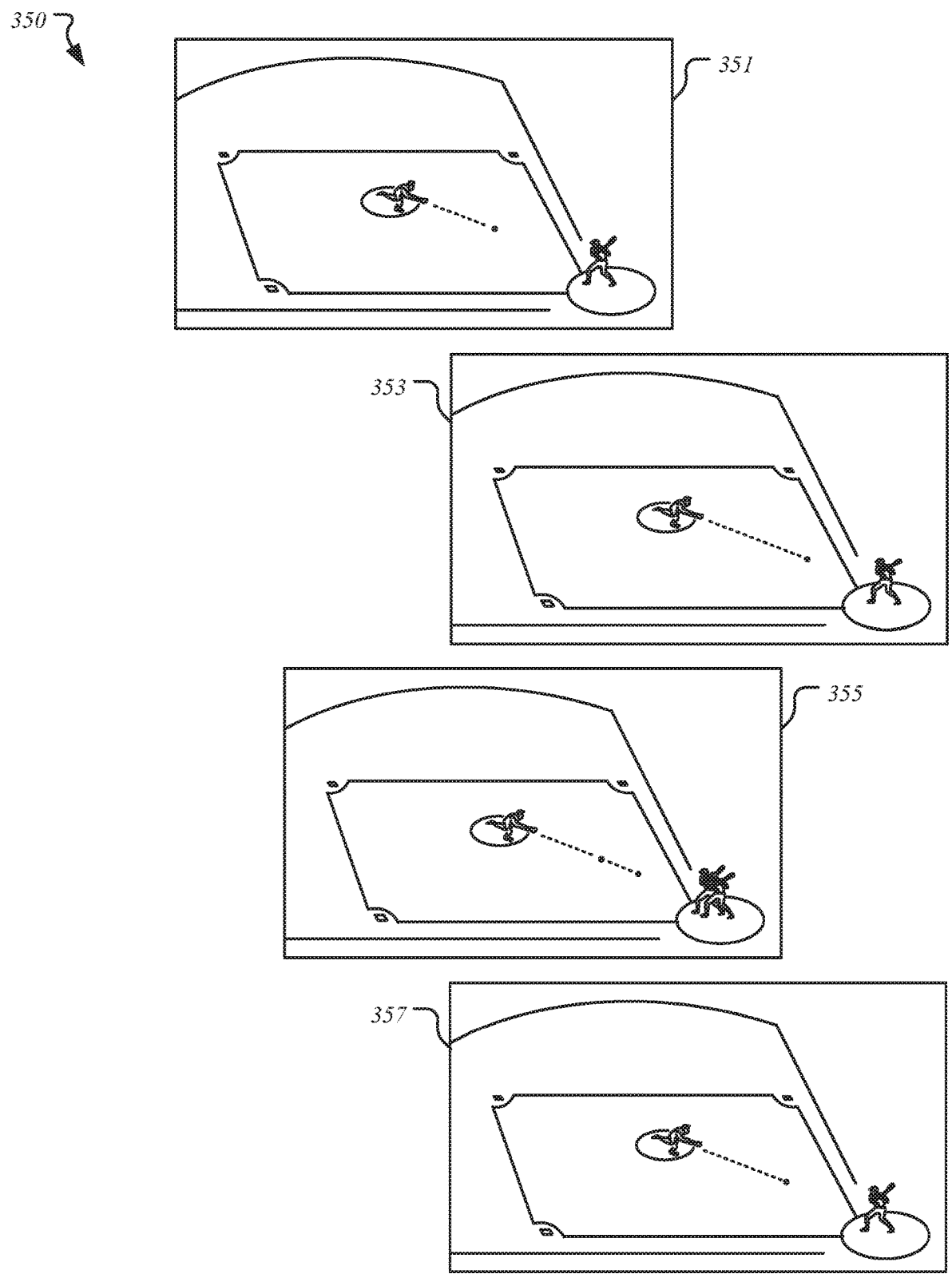
FIG. 3E illustrates a space-time view interpolation according to one embodiment.

FIG. 3E illustrates a space-time view interpolation 350 according to one embodiment. For brevity, many of the details previously discussed with reference to FIGS. 1-3D may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

In this illustrated embodiment, a combination of space-time interpolation 350 is presented, wherein a multi-camera system may use its multiple cameras to capture a video having frames spread over both space and time. In this illustration, image 1 351 is captured by camera 1 in space s at time t, while image 2 353 is captured by camera 2 in space s+1 at time t+1. In one embodiment, image 355 represents the overlapping of images 1 351 and 2 353 visualizing parallax, while view synthesis mechanism 110 of FIG. 1 view synthesizes based on input images 1 351, 2 353 using a trained neutral network to produce a middle image, such as image 357, representing a space-time-based intermediary view of images 1 351 and 2 353.

In one embodiment, for input image 1 (Im1) 351 and image 2 (Im2) 353 captured in spaces s and s+1 at time t and t+1, respectively, displacement/flow maps, F1 and F2, respectively, may be used to generate middle view 357, where target images $T1(x, y)=Im1(x+F1(x, y), y+F2(x, y))$ and $T2(x, y)=Im2(x-F1(x, y), y-F2(x, y))$ are generated by warping according to the generated flow maps, and used as input to the synthesis net (such as synthesis net 427 of FIG. 4B) leading to the target space-time middle image 357.

Figure 4A:
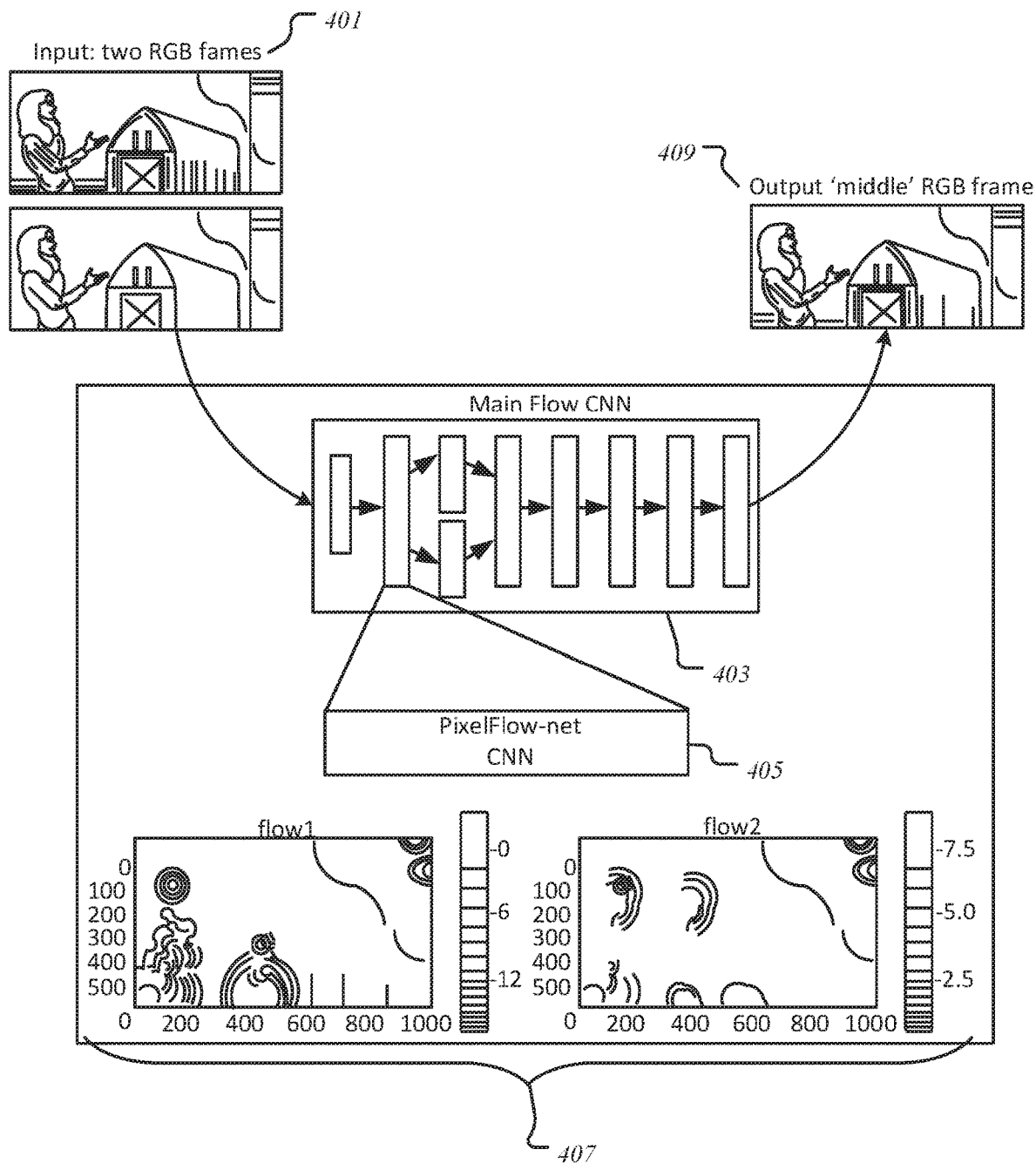
FIG. 4A illustrates a transaction sequence for cinematic space-time view synthesizing according to one embodiment.

FIG. 4A illustrates a transaction sequence 400 for cinematic space-time view synthesizing according to one embodiment. For brevity, many of the details previously discussed with reference to FIGS. 1-3E may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

As illustrated, in one embodiment, transaction sequence 400 may include neural network 403 (e.g., main CNN) trained by networking training logic 211 of FIG. 1 to perform one or more tasks or processes to view synthesize input images 401, 403 (e.g., RGB frames) representing multiple views of an object or scene to then output middle image 409 (e.g., RGB frame) for viewing by a user using one or more display devices, such as display(s) 243 of FIG. 2.

In one embodiment, two images 401, 403 captured by one or more cameras, such as camera(s) 241 of FIG. 2, are received as inputs into main CNN 403, being one of the neural network layers, and into another CNN, such as PixelFlow-CNN 405, being one of the other neural network layers. It is contemplated that neural network 403 is not limited to any number or type of layers and that embodiments are not limited to the term "PixelFlow-CNN" and/or the like. For example, neural network 403 may have any number and type of layers serving as primary or second layers, where one or more of such layers, such as PixelFlow-CNN 405, may be trained to perform one or more tasks or processes relating to cinematic space-time view synthesis as described with reference to FIG. 2.

For example, throughout this document, "PixelFlow-CNN" may be interchangeably referred to as "another CNN", "another neural network", "secondary CNN", "secondary neural network", "CNN layer", "neural network layer", "displacement CNN", "displacement neural network", "displacement/flow CNN", "displacement/flow neural network", "flow CNN", "flow neural network", "view synthesis CNN", "CNN", "view synthesis neural network", "PixelFlow-net", "neural network", or simply "network".

In this embodiment, upon receiving the pair of input images 401, 403, CNN 405 estimates a pair of flow or displacement maps corresponding to images 401 and 403 for each of x-y coordinates, respectively. Further, these flow maps use a custom layer to warp the pixels of the two input images such that the remainder of main-CNN 403 may then take these two warped images and output single RGB frame 409 that is the middle image of the two images 401, 403 representing an intermediate view between the two views of images 401, 403. Further, a displacement/flow map may be generated using any information relating to pixel flow or movement, such as pixel movement from one images to another, as shown in pixel graphs 407.

It is contemplated and to be noted that these novel flow or displacement maps are not the same as the conventional optical flow maps. For example, in one embodiment, a flow/displacement map represent a flow to a target view rather than between views. For example, for a pixel (x, y), the output view from warping is generated as follows: if Im0, Im1 are the input images, F0, F1 are their flow maps, and a custom layer generates two target images, T0, T1, as follows: 1) T0(x, y)=Im0(x+F0(x, y), y+F1(x, y)); and 2) T1(x, y)=Im1(x-F0(x, y), y-F1(x, y)), where T0 and T1 are both RGB images that can go through the remainder of main CNN 403 to output as a single final "middle" RGB image, such as $T_{Final}$.

In one embodiment, network training logic 211 of FIG. 2 may be used to train main CNN 403 and CNN 405 using various synthesis sequences containing object and camera motions (x, y and z), where these are generated using, for example, common rendering platform, unity, and scenes composed of random shapes and textures. Further, embodiments do not require real data for training, which may be difficult to obtain in large quantity for all possible camera motions and angels. This novel technique allows for the networks, such as main CNN 403 and CNN 405, to learn to map flow, motion, displacement, etc., between any two sets of frames/patches.

Figure 4B:
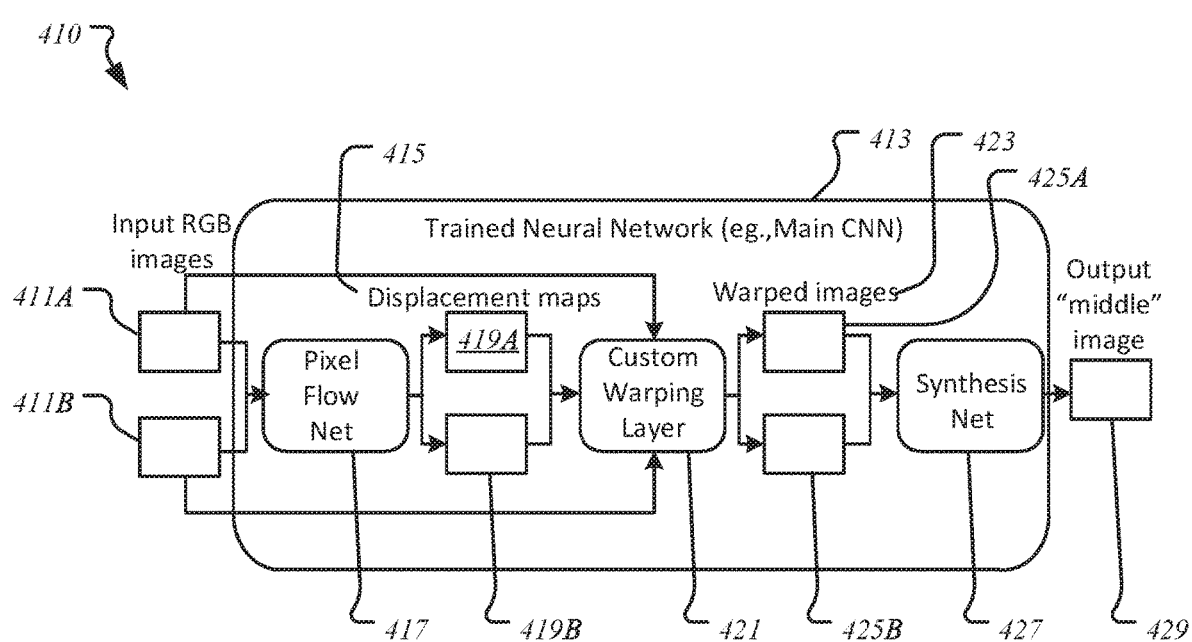
FIG. 4B illustrated a transaction sequence for cinematic space-time view synthesizing according to one embodiment.

It is contemplated that embodiments are not limited to any neural network architectures, such as those illustrated in FIGS. 4A-4B. For example, variations in a number of filters per each layer of a neural network, a number of layers in the encoder-decoder structure of CNN 405 or main CNN 403, etc. For example, in one embodiment, two-dimensional (2D) convolution (cony) may be used for processing, such as Conv2D(f, w, h) indicating a 2D convolution with f filters, each of (w, h) dimension. Further, as illustrated, neural network may include multiple CNNs, such as main CNN 403 and PixelFlow-CNN 405, where main CNN 403 includes inputs (input images 401, 403)→PixelFlow-CNN 405→Conv2D(32, 3, 3)→Conv2D(16, 3, 3)→Conv2D(8, 3, 3)→Conv2D(3, 1, 1)→output (middle image 409).

In one embodiment, PixelFlow-CNN 405 is an innovative and novel neural network that is generated and/or trained by network training logic 211 of FIG. 2 to perform any number and type of tasks, processes, computations, etc., to perform view synthesis of input images, such as images 401, 403, representing multiple views to generate a middle image, such as image 409, representing an intermediary view of the multiple views corresponding to images 401, 403. Further, in one embodiment, PixelFlow-CNN 405 may include and/or follow an encoder-decoder architecture that successively decreases the dimensions through maximum pooling till a certain size, such as 1/16, of the original input size, following by a decoder that can successfully up-sample and merge corresponding encoder feature maps till the final output flow maps are the same in dimension as the input.

For example, an initial Conv2D(32, 11, 11) that acts on each channels of the input (such as 6 channels from the two RGB input images 401, 403), where the filters map is concatenated and passed through as Conv2D(128, 1, 1). From here, in one embodiment, the encoder may be triggered, where each stage is made up of sets of layers named L #< >, where L #c refers to a Conv2D(*, 3, 3), L # refers to a SeperableConv2D(*, 5, 5), L # refers to a Conv2D(*, 1, 1). Further, for example, the number of filters at each stage may be 64, 96, 128, 128, 128, respectively. The decoder may be used for stages of unsampling, merging, and convolution layers, where each merge layer concatenates the up-sampled filter maps from a previous stage and corresponding maps from the encoder stage. In this example, all convolutions in the decoder are (3, 3), while the final stages of the network include (3, 3) convolutions using 16, 8, 4 and the final 2 filters.

FIG. 4B illustrates a transaction sequence 410 for cinematic space-time view synthesizing according to one embodiment. For brevity, many of the details previously discussed with reference to FIGS. 1-4A may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

In the illustrated embodiment, a neural network, such as main CNN 413, having one or more novel and trained neutral networks, such as PixelFlow Net 417, Synthesis Net 427, etc., that are used for performing view synthesizing of input images 411A, 411B captured by one or more cameras. It is contemplated that in some embodiments, the training of main CNN 413, as facilitated by network training logic 211 of FIG. 2, may be performed end-to-end as a single monolithic CNN. As previously discussed, these two RGB images 411A, 411B may be two views of an object or a scene from different cameras at the same time (resulting in space-images), or two frames captured from the same camera at different times (resulting in time-images), or a combination thereof (resulting in space-time images).

As illustrated, in one embodiment, main CNN 413 may be divided into a number of sections, such as a displacement/flow maps section 415, as facilitated by displacement processing logic 203 of FIG. 2, for taking input images 411A, 411B and generating a displacement map that finds where each pixel from a first image, such as image 411A, has moved into a second image, such as image 411B. In one embodiment, images 411A, 411B are processed through PixelFlow Net 417 resulting in corresponding displacement maps 419A, 419B, leading to custom warping layer 421.

Another section of main CNN 413 includes warping section 423 having custom warping layer 421 that takes images 411A, 411B and their corresponding displacement maps 419A and 419B to warp them into warped images 425A, 425B, respectively, as facilitated by warping logic 205 of FIG. 2. In one embodiment, another section may include a view synthesis section having a synthesis Net 427, as facilitated by synthesis/execution logic 207 of FIG. 2, to take both warped images 425A, 425B and combine them into a cleaner, smoother, and potentially artifact-free synthesized middle image 429. This middle image 429 may then be outputted by Synthesis Net 427, as facilitated by synthesis/execution logic 207 of FIG. 2, to allow for a smoother viewing experience for users through one or more display devices.

Figure 4C:
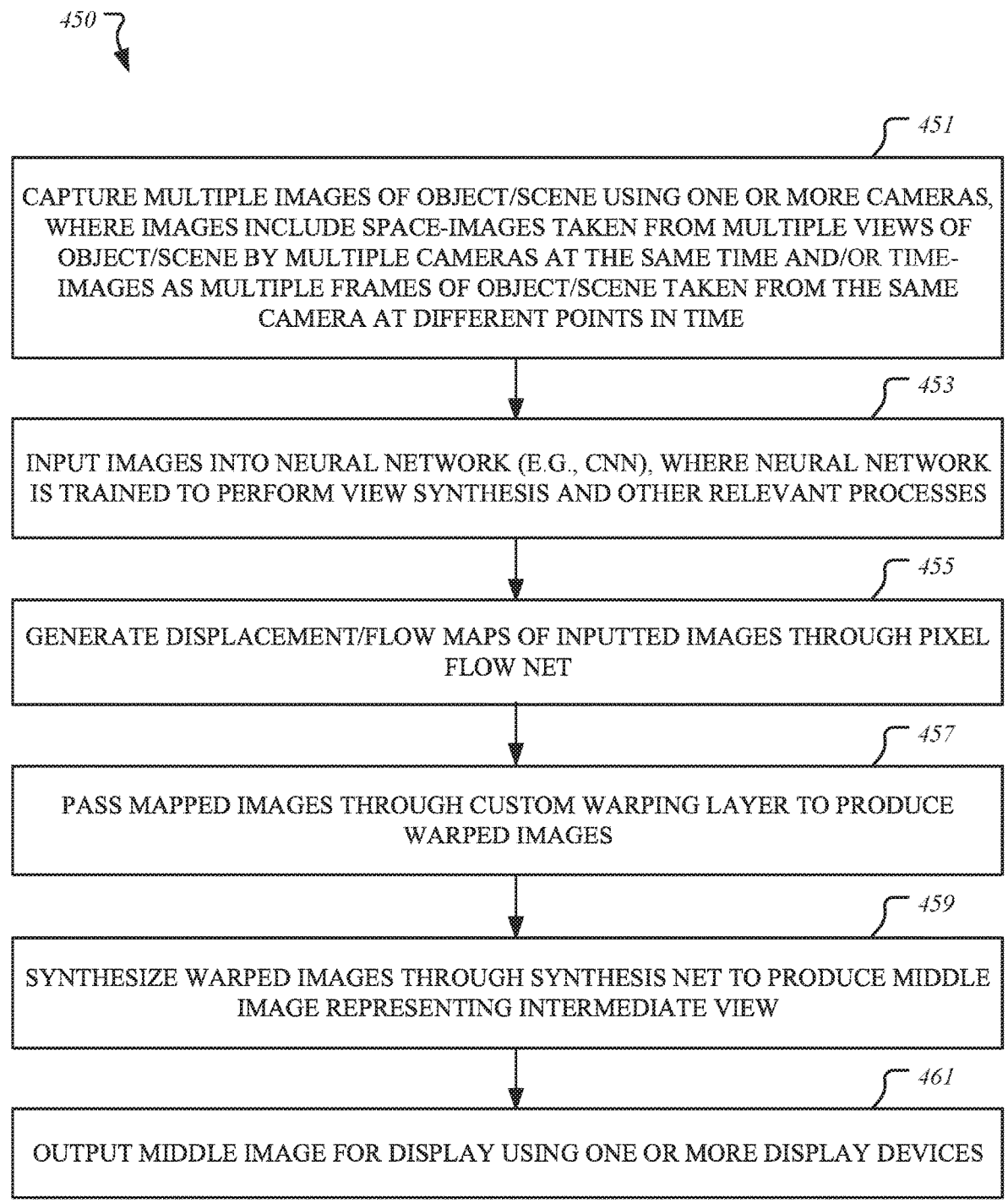
FIG. 4C illustrates a method for cinematic space-time view synthesizing according to one embodiment.

FIG. 4C illustrates a method 450 for cinematic space-time view synthesizing according to one embodiment. For brevity, many of the details previously discussed with reference to FIGS. 1-4A may not be discussed or repeated hereafter. Any processes or transactions relating to the illustrated cinematic space-time view synthesis may be performed by processing logic that may comprise hardware (e.g., circuitry, dedicated logic, programmable logic, etc.), software (such as instructions run on a processing device), or a combination thereof, as facilitated by view synthesis mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

Method 450 begins at block 451 with capturing of multiple images or frames of an object or a scene by one or more cameras associated with one or more computing devices, where images may include space-images taken by multiple cameras at the same time, or time-images taken by a single camera at different points in time, or a combination there of, such as space-time images. At block 403, the captured images are used as inputs to a neural network (e.g., CNN) having one or more internal trained networks or layers (e.g., PixelFlow, Synthesis, etc.) for performing certain tasks relevant to view synthesis of the input images.

At block 405, a displacement/flow map of the input images is generated by following the flow of pixels, such as how the pixels move from a first input image to a second input image. At block 407, mapped images are then passed through a custom warping layer to produce warped images corresponding to the input images. At block 409, warped images are synthesized through synthesis net to produce a middle image representing an intermediary view of the two views represented by the input images. At block 411, the middle image is outputted as the final image for display to the user through one or more display devices.

Figure 5:
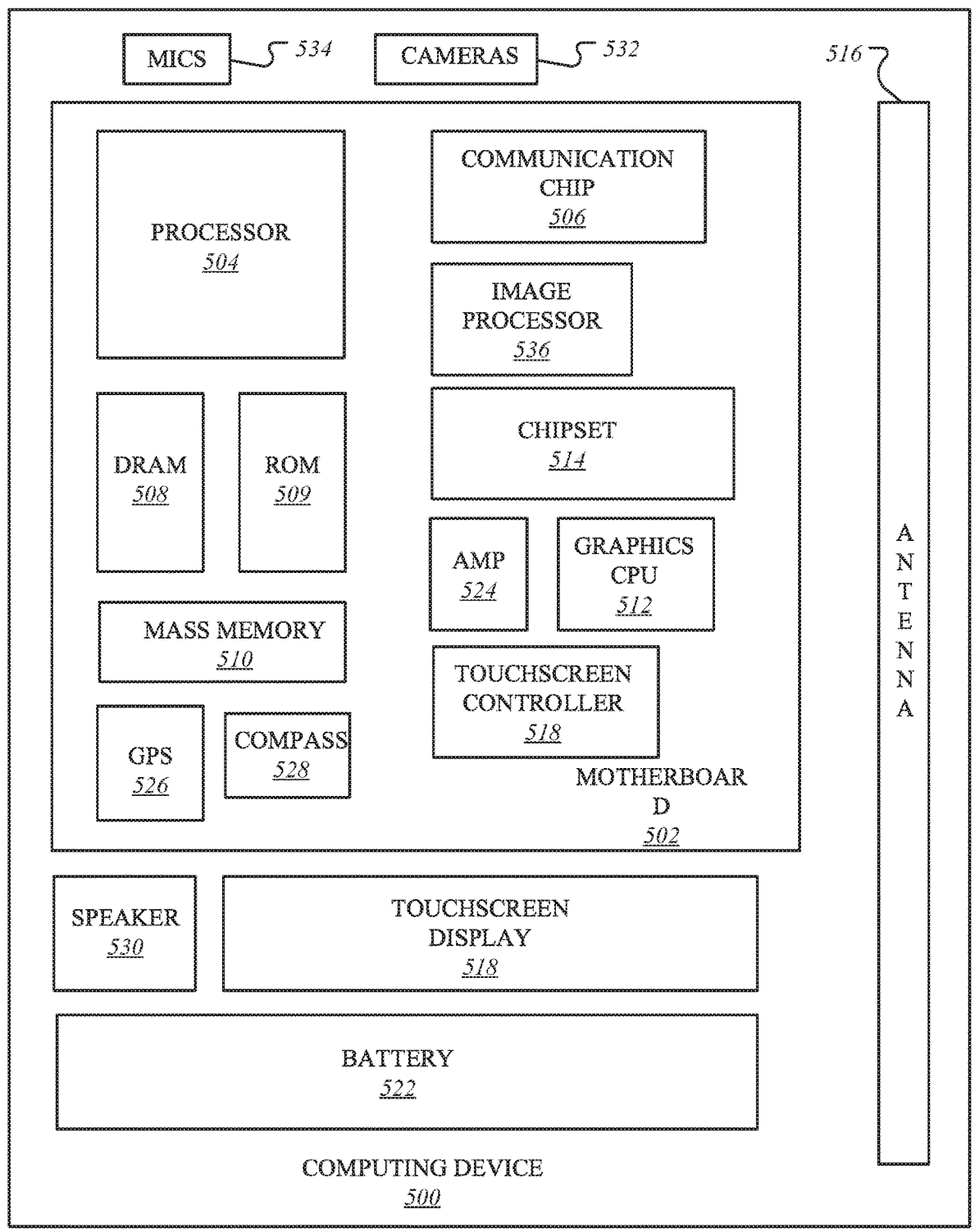
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
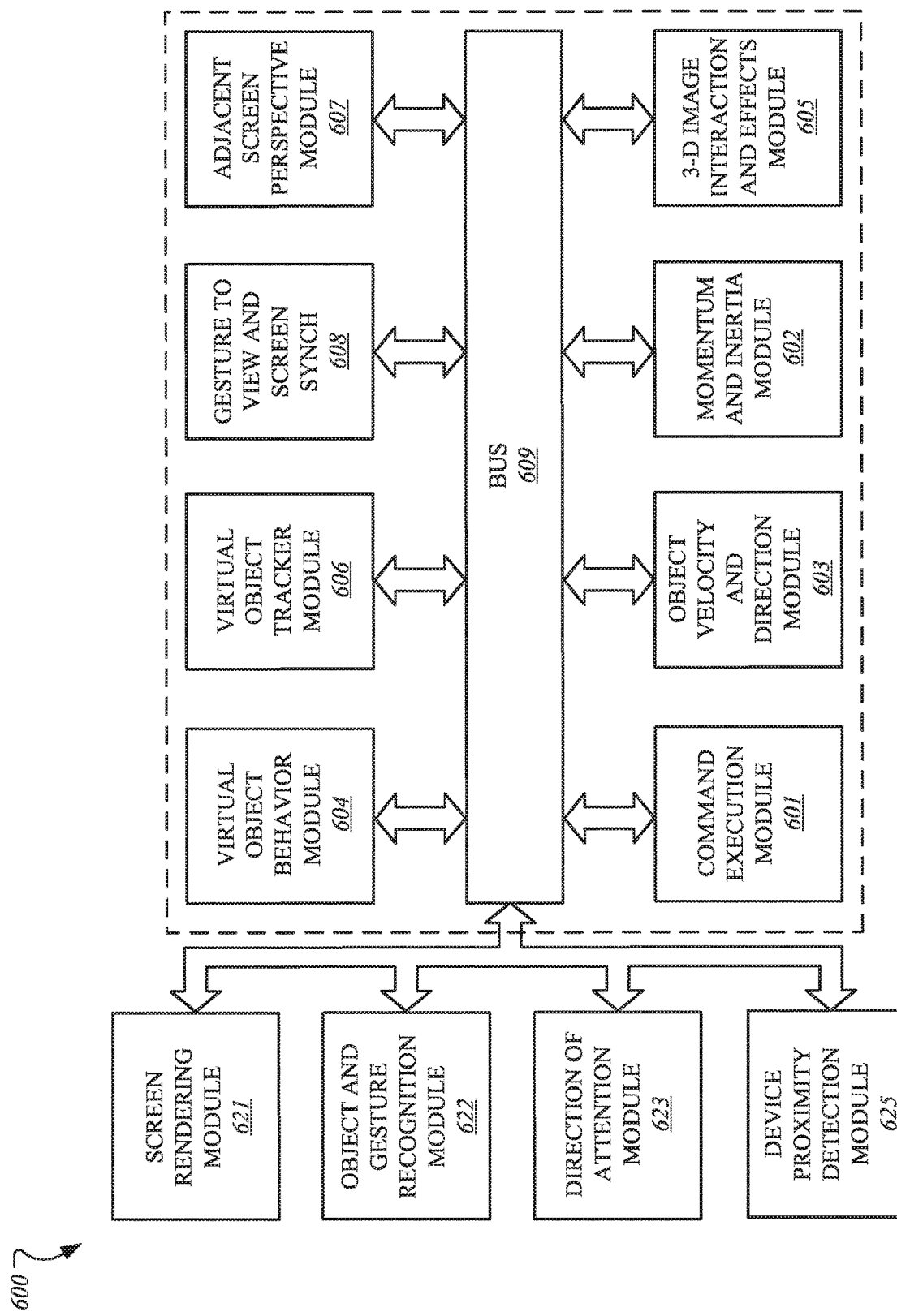
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate cinematic space-time view synthesis in computing environments, the apparatus comprising: detection/capturing logic to facilitate, via one or more cameras, capturing of multiple images at multiple positions or multiple points in times, wherein the multiple images represent multiple views of an object or a scene, wherein the one or more cameras are coupled to one or more processors; and synthesis/execution logic of a neural network to synthesize the multiple images into a single image including a middle image of the multiple images and representing an intermediary view of the multiple views.

Example 2 includes the subject matter of Example 1, wherein the multiple images comprise at least one of two space images or two time images, wherein the two space images are captured by at least two cameras at a single point in time, wherein the two time images are captured by a single camera at two points in time.

Example 3 includes the subject matter of Examples 1-2, wherein the middle image comprises at least one of a middle space image of the two space images, a middle time image of the two time images, and a middle space-time image of the multiple images.

Example 4 includes the subject matter of Examples 1-3, further comprising displacement processing logic of the neural network to generate a displacement map of the multiple images based on movement of pixels from one image of the multiple image to another image of the multiple images, wherein the multiple images are synthesized into the single image based on the displacement map.

Example 5 includes the subject matter of Examples 1-4, further comprising image warping logic set as a custom layer of the neural network to facilitate a warping layer to warp the multiple images into warped images based on the displacement map, wherein the multiple images are synthesized into the single image based on the warped images.

Example 6 includes the subject matter of Examples 1-5, further comprising network training logic to train the neural network, wherein training includes end-to-end training facilitating access to additional training data if the neural network serving as a main network is segmented into sub-components, wherein the neural network comprises a convolutional neutral network (CNN).

Example 7 includes the subject matter of Examples 1-6, wherein the one or more processors comprise a graphics processor co-located with an application processor on a common semiconductor package.

Some embodiments pertain to Example 8 that includes a method for facilitating cinematic space-time view synthesis in computing environments, the method comprising: capturing, by one or more cameras, multiple images at multiple positions or multiple points in times, wherein the multiple images represent multiple views of an object or a scene, wherein the one or more cameras are coupled to one or more processors of a computing device; and synthesizing, by a neural network, the multiple images into a single image including a middle image of the multiple images and representing an intermediary view of the multiple views.

Example 9 includes the subject matter of Example 8, wherein the multiple images comprise at least one of two space images or two time images, wherein the two space images are captured by at least two cameras at a single point in time, wherein the two time images are captured by a single camera at two points in time.

Example 10 includes the subject matter of Examples 8-9, wherein the middle image comprises at least one of a middle space image of the two space images, a middle time image of the two time images, and a middle space-time image of the multiple images.

Example 11 includes the subject matter of Examples 8-10, further comprising generating, by the neural network, a displacement map of the multiple images based on movement of pixels from one image of the multiple image to another image of the multiple images, wherein the multiple images are synthesized into the single image based on the displacement map.

Example 12 includes the subject matter of Examples 8-11, further comprising facilitating, by a custom layer of the neural network, a warping layer to warp the multiple images into warped images based on the displacement map, wherein the multiple images are synthesized into the single image based on the warped images.

Example 13 includes the subject matter of Examples 8-12, further comprising training the neural network, wherein training includes end-to-end training facilitating access to additional training data if the neural network serving as a main network is segmented into sub-components, wherein the neural network comprises a convolutional neutral network (CNN).

Example 14 includes the subject matter of Examples 8-13, wherein the one or more processors comprise a graphics processor co-located with an application processor on a common semiconductor package.

Some embodiments pertain to Example 15 that includes a data processing system comprising a computing device having memory coupled to a processor, the processor to: capture, by one or more cameras, multiple images at multiple positions or multiple points in times, wherein the multiple images represent multiple views of an object or a scene, wherein the one or more cameras are coupled to the processor; and synthesize, by a neural network, the multiple images into a single image including a middle image of the multiple images and representing an intermediary view of the multiple views.

Example 16 includes the subject matter of Example 15, wherein the multiple images comprise at least one of two space images or two time images, wherein the two space images are captured by at least two cameras at a single point in time, wherein the two time images are captured by a single camera at two points in time.

Example 17 includes the subject matter of Examples 15-16, wherein the middle image comprises at least one of a middle space image of the two space images, a middle time image of the two time images, and a middle space-time image of the multiple images.

Example 18 includes the subject matter of Examples 15-17, wherein the processor is further to generate, by the neural network, a displacement map of the multiple images based on movement of pixels from one image of the multiple image to another image of the multiple images, wherein the multiple images are synthesized into the single image based on the displacement map.

Example 19 includes the subject matter of Examples 15-18, wherein the processor is further to facilitate, by a custom layer of the neural network, a warping layer to warp the multiple images into warped images based on the displacement map, wherein the multiple images are synthesized into the single image based on the warped images.

Example 20 includes the subject matter of Examples 15-19, wherein the processor is further to train the neural network, wherein training includes end-to-end training facilitating access to additional training data if the neural network serving as a main network is segmented into sub-components, wherein the neural network comprises a convolutional neutral network (CNN).

Example 21 includes the subject matter of Examples 15-20, wherein the processor comprises a graphics processor co-located with an application processor on a common semiconductor package.

Some embodiments pertain to Example 22 includes an apparatus comprising: means for capturing, by one or more cameras, multiple images at multiple positions or multiple points in times, wherein the multiple images represent multiple views of an object or a scene, wherein the one or more cameras are coupled to one or more processors; and means for synthesizing, by a neural network, the multiple images into a single image including a middle image of the multiple images and representing an intermediary view of the multiple views.

Example 23 includes the subject matter of Example 22, wherein the multiple images comprise at least one of two space images or two time images, wherein the two space images are captured by at least two cameras at a single point in time, wherein the two time images are captured by a single camera at two points in time.

Example 24 includes the subject matter of Example 22-23, wherein the middle image comprises at least one of a middle space image of the two space images, a middle time image of the two time images, and a middle space-time image of the multiple images.

Example 25 includes the subject matter of Example 22-24, further comprising means for generating, by the neural network, a displacement map of the multiple images based on movement of pixels from one image of the multiple image to another image of the multiple images, wherein the multiple images are synthesized into the single image based on the displacement map.

Example 26 includes the subject matter of Example 22-25, further comprising means for facilitating, by a custom layer of the neural network, a warping layer to warp the multiple images into warped images based on the displacement map, wherein the multiple images are synthesized into the single image based on the warped images.

Example 27 includes the subject matter of Example 22-26, further comprising means for training the neural network, wherein training includes end-to-end training facilitating access to additional training data if the neural network serving as a main network is segmented into sub-components, wherein the neural network comprises a convolutional neutral network (CNN).

Example 28 includes the subject matter of Example 22-27, wherein the one or more processors comprise a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
    memory; and
    at least one processor including a graphics processing unit, the at least one processor to:
        access first and second images in a first series of images of a first video, the first image immediately preceding the second image in the first series of images, the first and second images corresponding to respective first and second views;
        generate first optical flow data based on a change of position of first pixels in the first image relative to corresponding ones of second pixels in the second image;
        generate second optical flow data based on a change of position of third pixels in the second image relative to corresponding ones of fourth pixels in the first image;
        generate a first warped image based on the first image and the first optical flow data;
        generate a second warped image based on the second image and the second optical flow data;
        use a neural network to synthesize the first and second warped images into a single intermediate image, the intermediate image corresponding to an intermediate view between the first and second views corresponding to the first and second images respectively; and
        generate a second series of images for a second video, the second series of images corresponding to the first series of images, the second series of images having a higher number of images than the first series of images, the second series of images including the first image, the second image, and the intermediate image.

2. The apparatus of claim 1, wherein the second series of images is to provide a smoother slow-motion effect than the first series of images.

3. The apparatus of claim 1, wherein the neural network is a first neural network, the at least one processor to use a second neural network to generate the first optical flow data and the second optical flow data.

4. The apparatus of claim 3, wherein the first and second neural networks are part of a single network, the single network to be trained end-to-end.

5. The apparatus of claim 3, wherein at least one of the first neural network or the second neural network is a convolutional neural network.

6. The apparatus of claim 5, wherein the convolutional neural network is to implement at least one of an encoder or a decoder.

7. The apparatus of claim 1, further including:
at least one storage device;
wireless communication circuitry; and
at least one antenna.

8. The apparatus of claim 1, further including a display to present the second series of images for the second video.

9. The apparatus of claim 1, further including at least one camera to generate the first series of images for the first video.

10. At least one storage device comprising instructions that, when executed, cause at least one processor to:
access first and second images in a first series of images of a first video, the first image immediately preceding the second image in the first series of images, the first and second images corresponding to respective first and second views;
generate first optical flow data based on a change of position of first pixels in the first image relative to corresponding ones of second pixels in the second image;
generate second optical flow data based on a change of position of third pixels in the second image relative to corresponding ones of fourth pixels in the first image;
generate a first warped image based on the first image and the first optical flow data;
generate a second warped image based on the second image and the second optical flow data;
execute a neural network to combine the first and second warped images into a single intermediate image, the intermediate image corresponding to an intermediate view between the first and second views corresponding to the first and second images respectively; and
generate a second series of images for a second video, the second series of images corresponding to the first series of images, the second series of images having a higher number of images than the first series of images, the second series of images including the first image, the second image, and the intermediate image.

11. The at least one storage device of claim 10, wherein the second series of images is to provide a smoother slow-motion effect than the first series of images.

12. The at least one storage device of claim 10, wherein the neural network is a first neural network, the instructions to cause the at least one processor to execute a second neural network to generate the first optical flow data and the second optical flow data.

13. The at least one storage device of claim 12, wherein at least one of the first neural network or the second neural network is a convolutional neural network.

14. The at least one storage device of claim 13, wherein the convolutional neural network is to implement at least one of an encoder or a decoder.

15. The at least one storage device of claim 12, wherein the first and second neural networks are part of a single network, the single network to be trained end-to-end.

16. A method comprising:
accessing first and second images in a first series of images of a first video, the first image immediately preceding the second image in the first series of images, the first and second images corresponding to respective first and second views;
generating first optical flow data based on a change of position of first pixels in the first image relative to corresponding ones of second pixels in the second image;
generating second optical flow data based on a change of position of third pixels in the second image relative to corresponding ones of fourth pixels in the first image;
generating a first warped image based on the first image and the first optical flow data;
generating a second warped image based on the second image and the second optical flow data;
synthesizing, using a neural network, the first and second warped images into a single intermediate image, the intermediate image corresponding to an intermediate view between the first and second views corresponding to the first and second images respectively; and
generating a second series of images for a second video, the second series of images corresponding to the first series of images, the second series of images having a higher number of images than the first series of images, the second series of images including the first image, the second image, and the intermediate image.

17. The method of claim 16, wherein the second series of images is to provide a smoother slow-motion effect than the first series of images.

18. The method of claim 16, wherein the neural network is a first neural network, and generating the first optical flow data and the second optical flow data includes using a second neural network different than the first neural network.

19. The method of claim 18, wherein at least one of the first neural network or the second neural network is a convolutional neural network.

20. The method of claim 19, wherein the convolutional neural network is to implement at least one of an encoder or a decoder.

21. The method of claim 18, wherein the first and second neural networks are part of a single network, the single network to be trained end-to-end.

22. An apparatus comprising:
means for storing information; and
means for executing instructions, the executing means to:
access first and second images in a first series of images of a first video, the first image immediately preceding the second image in the first series of images, the first and second images corresponding to respective first and second views;
generate first optical flow data based on a change of position of first pixels in the first image relative to corresponding ones of second pixels in the second image;

generate second optical flow data based on a change of position of third pixels in the second image relative to corresponding ones of fourth pixels in the first image;

generate a first warped image based on the first image and the first optical flow data;

generate a second warped image based on the second image and the second optical flow data;

use a neural network to combine the first and second warped images into a single intermediate image, the intermediate image corresponding to an intermediate view between the first and second views corresponding to the first and second images respectively; and generate a second series of images for a second video, the second series of images corresponding to the first series of images, the second series of images having a higher number of images than the first series of images, the second series of images including the first image, the second image, and the intermediate image.

23. The apparatus of claim 22, wherein the second series of images is to provide a smoother slow-motion effect than the first series of images.

24. The apparatus of claim 22, wherein the neural network is a first neural network, the executing means to use a second neural network distinct from the first neural network to generate the first optical flow data and the second optical flow data.

25. The apparatus of claim 24, wherein at least one of the first neural network or the second neural network is a convolutional neural network.

26. The apparatus of claim 25, wherein the convolutional neural network is to implement at least one of an encoder or a decoder.

27. The apparatus of claim 24, wherein the first and second neural networks are part of a single network, the single network to be trained end-to-end.

* * * * *